Aug. 15, 1950     C. M. OSTERHELD     2,518,566
EGG BAKER
Filed April 5, 1945                                      3 Sheets-Sheet 1
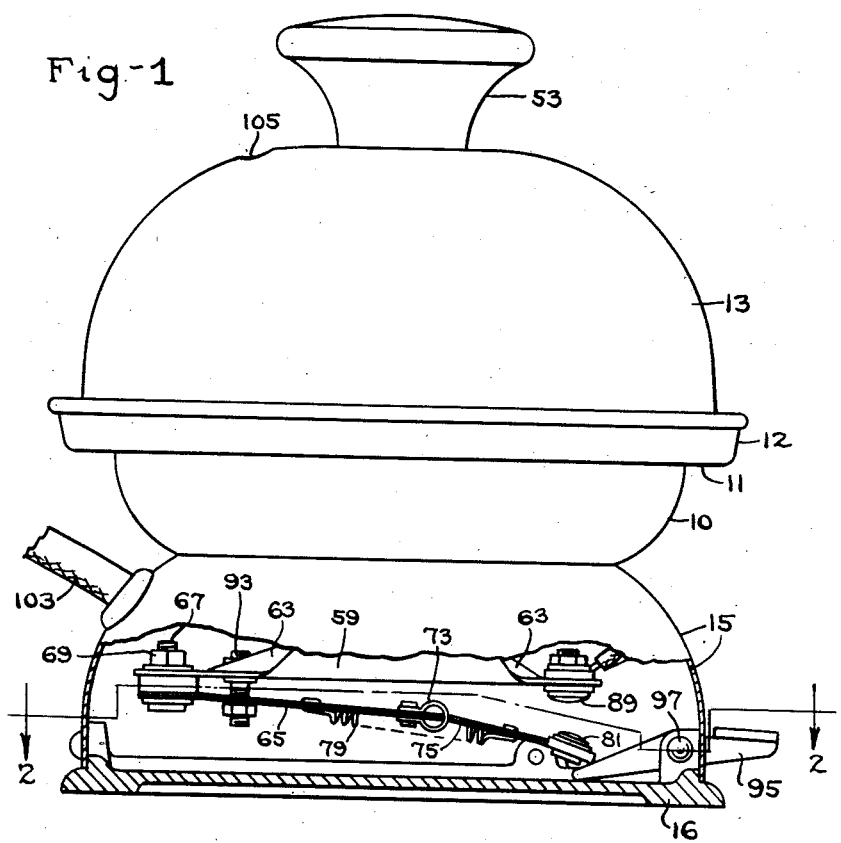
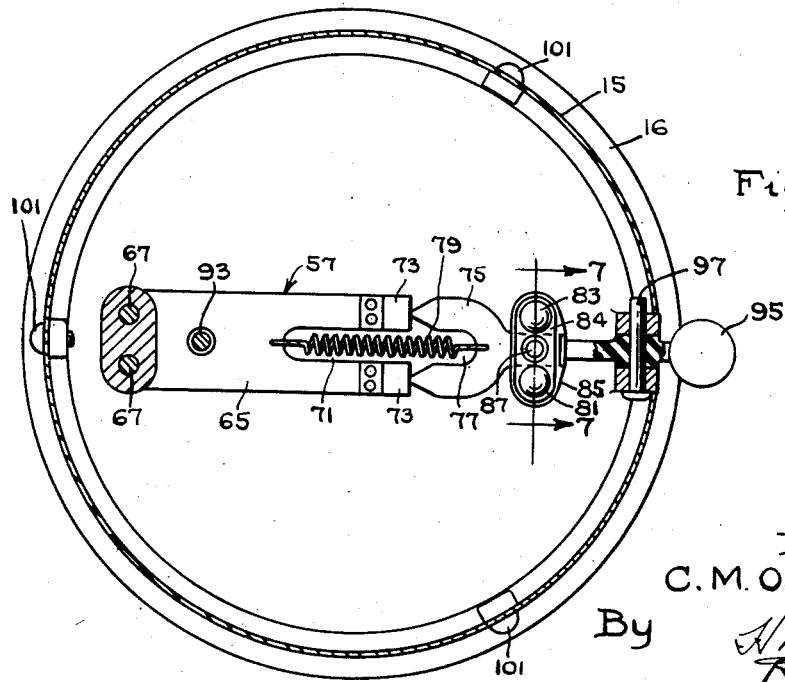
Inventor:
C. M. Osterheld.
By H. M. Biebel
Attorney.

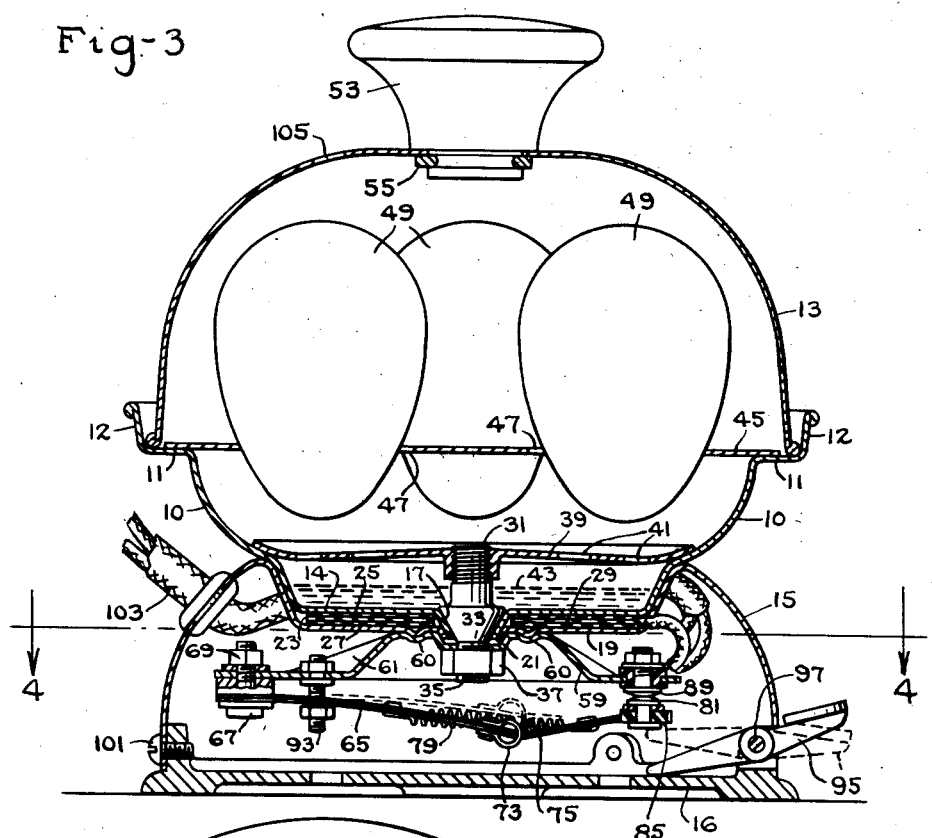
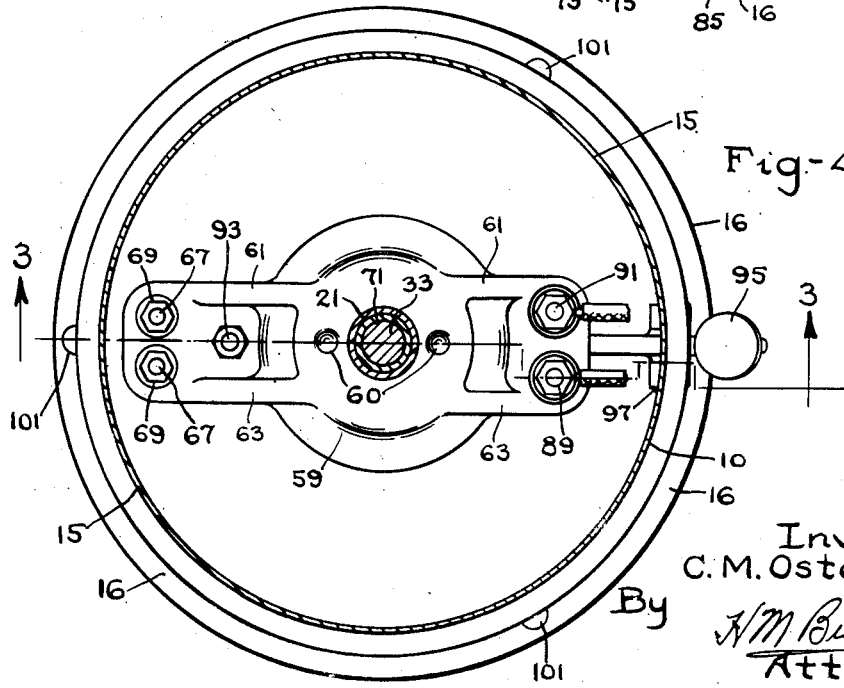

Aug. 15, 1950     C. M. OSTERHELD     2,518,566
EGG BAKER
Filed April 5, 1945     3 Sheets-Sheet 3
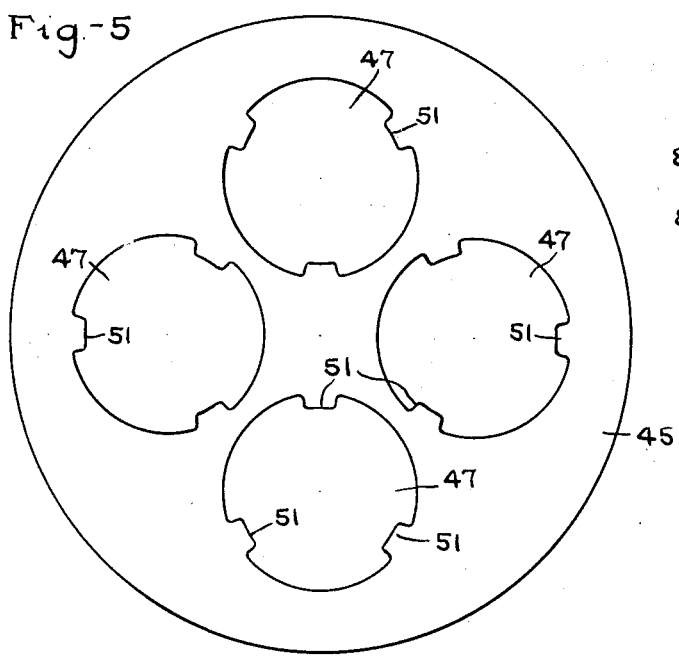
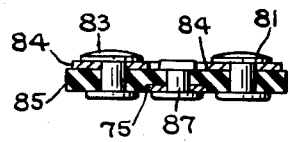
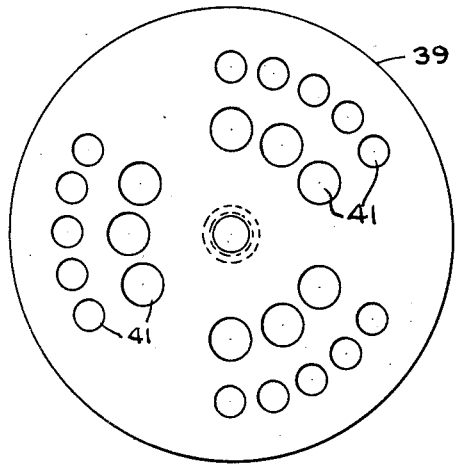
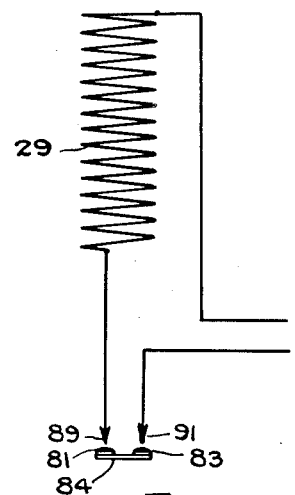
Inventor
C. M. Osterheld.
By H. M. Biebel
Attorney.

Patented Aug. 15, 1950

2,518,566

UNITED STATES PATENT OFFICE 2,518,566

EGG BAKER

Clark M. Osterheld, Stoughton, Wis., assignor to McGraw Electric Company, Elgin, Ill., a corporation of Delaware Application April 5, 1945, Serial No. 586,713

2 Claims. (Cl. 219—44)

My invention relates to cooking appliances and particularly to electrically operated egg cookers.

An object of my invention is to provide a relatively simple electrically operated egg cooker having a minimum number of parts.

Another object of my invention is to provide a casing adapted to contain the eggs to be cooked as well as a measured quantity of water which is evaporated by an electrical heating element, the eggs being cooked by subjection to steam.

Another object of my invention is to provide an automatic electric cut-out effective upon evaporation of the measured quantity of water to de-energize the electric heating element and to maintain itself in open position until manually reclosed.

Other objects of my invention will either be apparent from a description of one form of device embodying my invention or will be pointed out in the course of such description and be set forth in the appended claims.

In the drawings,

Figure 1 is a side elevational view of an egg baker with lower parts broken away to show the snap-acting cut-out in open position, Fig. 2 is a horizontal sectional view therethrough taken on the line 2—2 of Fig. 1.

Fig. 3 is a vertical, sectional view taken on the line 3—3 of Fig. 4 with the parts shown at the start of an operating cycle, Fig. 4 is a horizontal, sectional view taken on the line 4—4 of Fig. 3, Fig. 5 is a top plan view of the egg tray, Fig. 6 is a top plan view of the steam baffle plate, Fig. 7 is an enlarged view of the bridging member of the electric cut-out taken on the line 7—7 of Fig. 2, and, Fig. 8 is a wiring diagram.

My improved egg cooker or baker comprises a relatively shallow casing 10, a cover member 13, an inverted cup-shaped casing 15 for supporting and retaining casing 10, and a supporting base member 16. The open end of the shallow casing 10 has an outwardly extending circumferential rim 11 that is provided with a perpendicular lip 12 to form both an enclosure and a support for the interfitting cover 13. Preferably, although not necessarily, I make members 10, 13, and 15 of formed sheet metal. The lower portion or base 14 of casing 10 is substantially of depressed flat shape having its central portion pressed downwardly to form an open ended extension portion 17 of inverted cone-shape. The upper end or face surface 19 of supporting member 15 is also of depressed flat shape and has a small open ended central portion 21, slightly depressed, also of cone-shape, adapted to engage the lower end portion 17 of the casing 10, while at the same time the casing will be supported by member 15 through the partial engagement of a portion of their respective circumferential walls.

I provide an electric heating element designated generally by numeral 23 which electric heating element is adapted to be positioned between the lower flat central portion of casing 10 and the portion 19 of the support 15. The heating element may include an upper thin annular sheet 25 of mica, a lower thin annular sheet 27 also of mica, and an intermediate annular sheet of mica on which is wound a resistor strip 29 of suitable resistor material. This provides a substantially annular electric heating element which is positioned as stated hereinbefore.

I provide further a clamping member 31, of generally bolt shape, the upper end portion of which is provided with external screw threads for a purpose which will hereinafter appear and which is provided also with an intermediate portion 33 which is of relatively larger diameter at its upper end to fit into the central portion 17 of the casing 10. The lower end portion 35 of clamping member 31 is of reduced diameter and is provided with screw threads to receive a clamping nut 37 which is effective to tightly compress portion 21 into close fluid-tight operative engagement with the lower end of portion 17.

A steam baffle plate 39 has a central screw-threaded portion which is adapted to be screwed onto the upper screw-threaded portion of clamping member 31 until the outer periphery of member 39 rests upon the upper surface of the intermediate portion of casing 10. The member 39 is provided with a plurality of openings 41 to permit upward flow of steam which is generated by the electric heating element 23 when a measured quantity of water 43 is placed in the container 10.

An egg supporting plate 45 shown in top plan view in Fig. 5 of the drawings is provided with a plurality of egg receiving openings 47 therein and I have elected to show four such openings, each one of which is provided with three inwardly projecting portions 51 so that an egg 49 supported by plate 45 will have engagement with plate 45 at three points only and it will be noted that the peripheral extent of these egg supporting portions 51 is relatively very small. The steam generated from the measured quantity of water 43 in casing 10 and flowing upwardly will therefore flow along substantially the entire outer surface of each egg supported by the egg supporting plate 45.

I provide further a cover 13 which has suitably secured thereto a handle member 53, which handle member is held in its proper operative position as by a spring ring 55 having interfitting and interlocking engagement with that portion of handle 53 extending through and below the cover 13.

I provide further an automatic electric cut-out designated generally by numeral 57, which is supported by a metal bar 59 which has a central portion through which bolt 31 may extend, said bar being held in coordinating alinement with the switch closure means by having in said bar a pair of circular indents 60 engaging similarly shaped indents in plate 19 and which is held in tight heat transmitting engagement with the portion 21 of support 15 by nut 37. In order to strengthen the metallic support 59, I have provided indented portions 61 and 63 on opposite sides of member 59.

The cut-out comprises a first bimetal bar 65, one end of which is supported by, say the left hand end portion of metal member 59 and is held in proper operative position thereon as by a pair of headed bolts 67, each one having a nut 69 screwed therein.

The movable end portion of member 65 is provided with a central slot 71 and each of the two side portions of the bimetal bar 65 is provided with pivot plates 73, each of the pivot plates 73 having an indentation therein to receive the sharpened end portions of a second bimetal bar 75 which also has a longitudinally extending slot 77 therein at its left hand end portion. An overcenter spring 79 has its ends connected to the respective bimetal elements 65 and 75 adjacent the ends of the recesses 71 and 77. A contact bridging member having two contacts 81 and 83 thereon electrically connected by a bar 84 is insulatedly mounted on the outer free end of member 75, a washer 85 of electric-insulating material being secured to member 75 as by a rivet 87. The contact bridging member comprising the two contacts 81 and 83 is adapted to operatively engage a pair of fixed contacts 89 and 91 which are insulatedly mounted on member 59. The diagram of connections of the device is shown in Fig. 8 of the drawings.

The design, construction and adjustment of the thermally-actuable cut-out as by an adjusting bolt 93, is such that when moved to closed position manually as by a member 95 of substantially bar shape which is pivotally supported as on a pin 97, which pin may be supported by a member of heat-insulating material and of substantially annular shape which is held by a plurality of screws 101 against the lower edge of support 15 to heat insulate the metallic member 15 from the upper surface of the table on which it may be placed.

Let it be assumed that a user wishes to cook two eggs to a predetermined desired degree. He will put a predetermined quantity of water 43 in the casing 10 and will also place the desired number of eggs on the egg support 45, will then cover the eggs by cover 13 and will press on member 95 as shown in dotted lines of Fig. 3 to cause closure of the switch by upward movement of the contacts 81 and 83. The design, construction and adjustment of the electric snap-acting cut-out comprising bimetal bars 65 and 75 is such that upward movement of the inner end of member 95 will cause engagement of the contacts 81 and 83 with the fixed contacts 89 and 91 and energization of the heating resistor 29 assuming, of course, that the twin conductor cord 103 has been connected to a suitable source of supply of electric energy. Since it is necessary to use only a relatively thin walled container 10 and its support 15, the water 43 will be quickly brought to the boiling point and steam will be generated, which steam will rise upwardly and flow outwardly through the openings 41 and up past the eggs in the openings 47 in the support 45 and then outwardly through a vent 105. As long as there is any water left in the casing 10 below baffle plate 39, this generation and upward flow of steam will continue. However, as soon as all of the water placed initially in the casing 10 has been evaporated, the clamping bolt 31 will begin to experience a quick rise of temperature beyond 212° and this temperature will be transmitted particularly to the bimetal bar 65 with the result that the bimetal bar as shown in Fig. 3 will move from the full line position to the dotted line position so that the contact members 81 and 83 will be moved quickly out of engagement with fixed contacts 89 and 91 and the bimetal bar and contacts 81 and 83 will move to the full line position shown in Fig. 1 of the drawings, thereby deenergizing the heating element comprising the resistor member 29.

The contacts 81 and 83 will remain in their open position until they are reclosed for a second or succeeding operation after another measured quantity 43 of water has been supplied and one or more eggs 49 placed in the device ready for cooking when a quick downward pressure on member 95 will cause movement of contacts 81 and 83 into engagement with fixed contacts 89 and 91.

The device embodying my invention therefore provides a relatively simple egg cooking or baking device, the degree of baking of the eggs being proportional to the quantity of water which is placed in container 10. If one user desires to have, say "soft boiled" eggs, he will put in a measured quantity, say two or three teaspoonsful of water while if another user desires "hard boiled" eggs, he may put in four or five teaspoonsful of water in container 10. It is obvious that once the circuit has been closed through the resistor 29 by pressure on member 95 on the outside of the support 15, that the circuit will remain closed until evaporation of the water in container 10 has been effected after which the thermal cut-out will move to open position and will remain in open position through all handling to which the egg cooker may be subjected.

The thermally-actuable cut-out is not desired to, nor will it cause, deenergization of the electric heater after a certain predetermined length of time, but will only deenergize the heater after vaporization of substantially all of the water which was placed initially in the container of the egg baker and the degree of cooking of eggs is therefore dependent upon the quantity of water placed in casing 10.

Various modifications may be made in the device embodying my invention without departing from the spirit and scope thereof and all such modifications clearly coming within the scope of the appended claims are to be considered as being covered thereby.

I claim as my invention:

1. An egg baker comprising a relatively shallow metal casing having a centrally perforated flat bottom surface, a metal base member having a perforated depressed flat upper surface, said casing and base member engaging each other along the ring-like margin of said depressed surface of said base for leaving a shallow space between said flat bottom and upper surfaces, an annular electric heating element in said shallow space, a bolt extending through the perforated bottom and upper surfaces to hold them in close operative engagement with the heating element, a metallic support held by said bolt against the under surface of said base member, a thermally-actuable cut-out for said heating element on said metallic support adapted to move into open position upon vaporization of water placed in said casing above said heating element and means manually-actuable from the outside of the metal base for causing movement of the cut-out to closed position.

2. An egg baker comprising a relatively shallow metal casing having a centrally perforated flat bottom surface, a metal base member having a perforated depressed flat upper surface, an annular electric heating element between said flat bottom and upper surfaces, a bolt extending through the perforated bottom and upper surfaces to hold them in close operative engagement with the heating element, a perforated steam seal plate held by said bolt a predetermined distance above said flat bottom surface, a perforated egg supporting plate held by said casing above said steam seal plate and a removable cover for said casing interfitting therewith and supported thereby.

CLARK M. OSTERHELD.

REFERENCES CITED

The following references are of record in the file of this patent:

UNITED STATES PATENTS

| Number | Name | Date |
|---|---|---|
| 493,422 | Capek | Mar. 14, 1893 |
| 1,055,882 | Cubitt | Mar. 11, 1913 |
| 1,060,264 | Lamb | Apr. 29, 1913 |
| 1,504,269 | Rankin | Aug. 12, 1924 |
| 1,572,991 | Colby | Feb. 16, 1926 |
| 1,810,650 | Fay | June 16, 1931 |
| 1,905,111 | Lamb | Apr. 25, 1933 |
| 2,057,741 | Purpura | Oct. 20, 1936 |
| 2,061,837 | Hanks et al. | Nov. 24, 1936 |
| 2,102,342 | Walder | Dec. 14, 1937 |
| 2,139,267 | Hashek | Dec. 6, 1938 |
| 2,269,112 | Jepson et al. | Jan. 6, 1942 |